Feb. 24, 1953     M. C. FUQUA     2,629,747
SPENT ACID RESTORATION PROCESS
Filed Dec. 16, 1950
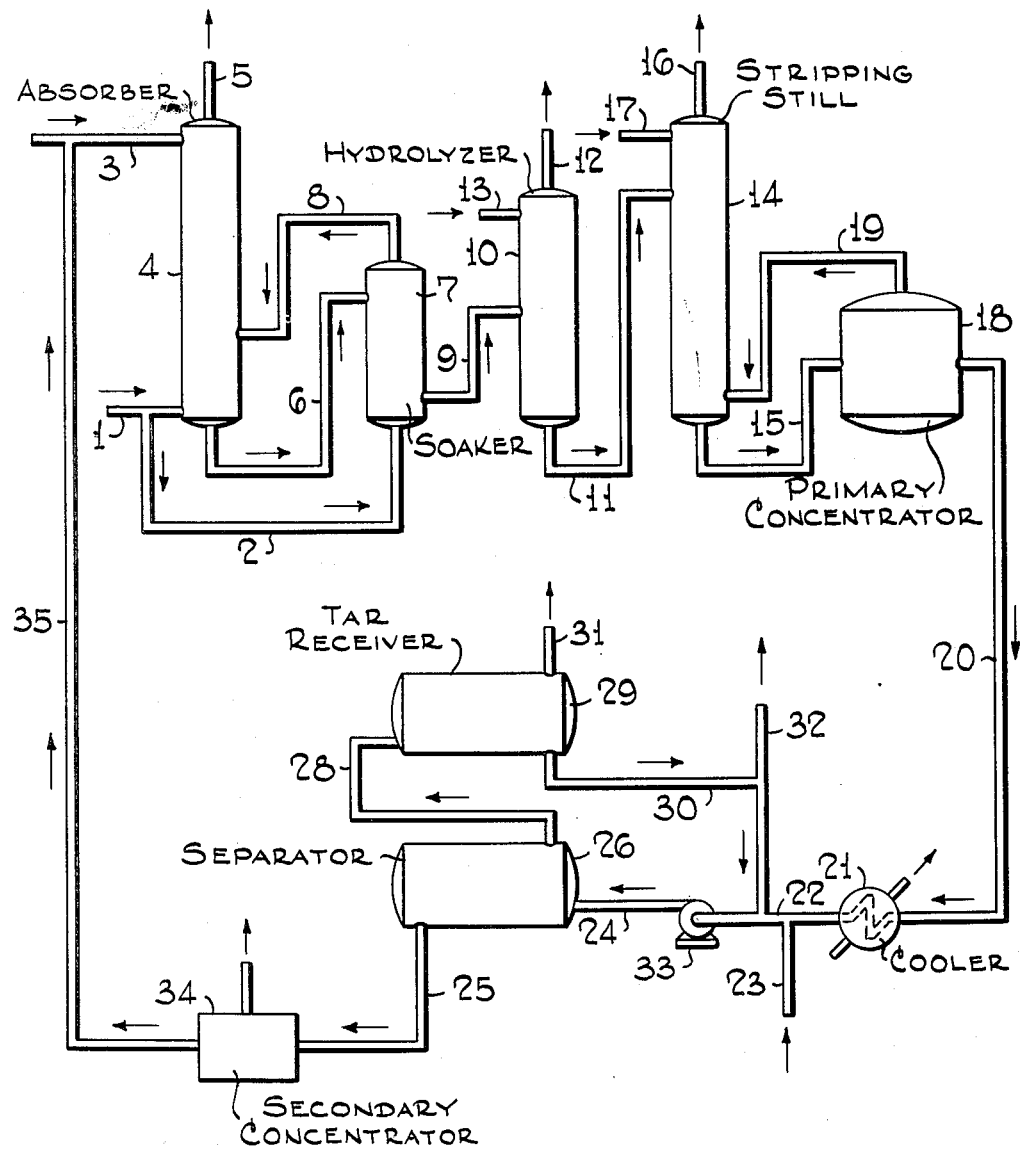
Mack C. Fuqua    Inventor
By Henry Berk    Attorney Patented Feb. 24, 1953

2,629,747

UNITED STATES PATENT OFFICE 2,629,747

SPENT ACID RESTORATION PROCESS

Mack C. Fuqua, Baton Rouge, La., assignor to Standard Oil Development Company, a corporation of Delaware Application December 16, 1950, Serial No. 201,077

7 Claims. (Cl. 260—639)

This invention relates to a process for the removal of carbonaceous material from dilute aqueous spent sulfuric acid in a process in which the acid is being concentrated to a higher acid strength. The invention relates more particularly to the concentration of a dilute aqueous sulfuric acid contaminated with dissolved and entrained carbonaceous particles and resulting from the preparation of alcohols by the sulfuric acid-catalyzed hydration of olefin hydrocarbons.

One of the major problems encountered in the manufacture of alcohols from olefins by the strong sulfuric acid absorption processes is that of removing carbonaceous degradation products from the spent dilute aqueous sulfuric acid recovered from the alcohol generator wherein the sulfuric acid extract is steam-stripped to yield the alcohol. Normally, in the ethanol system about 0.3 to 0.5 weight percent (based on circulated acid) of higher molecular weight alcohols, polymers, tars, resins, sulfur-containing compounds and other materials are formed by side reactions of ethylene and heavier unsaturated materials in the feed stream during each pass of acid through the system. Most of these materials remain with the acid since they are not steam-stripped from the acid under the alcohol generation conditions employed. The impurities are further degraded to suspended carbonaceous material under the influence of high temperature and acid strengths encountered in the acid reconcentration operation. Failure to maintain a low carbon concentration level in the restored acid results in plugging of equipment, fouling of heat transfer surfaces, and loss of acid concentrating capacity.

In U. S. Patent 2,512,327 there is disclosed a process of removing carbonaceous material from dilute aqueous spent sulfuric acid by washing the dilute acid with a hydrocarbon oil essentially non-reactive to the acid and floating the suspended carbonaceous material out of the acid in a resulting hydrocarbon oil layer which separates from a purified acid layer. In this operation the oil acts as a flux to accelerate the settling of the suspended material and gives more complete separation. The layers are separated and the upper oil layer is processed for further recovery of acid, while the bottom aqueous acid layer is fed to acid concentration facilities.

It has now been found that certain disadvantages, inherent in the process of the above-mentioned patent and chiefly concerned with the very corrosive nature of hot 45% acid, can be overcome by the newly-discovered technique which involves first the partial concentration of the dilute acid to an intermediate strength; second, the settling of the contaminated intermediate srength acid in the presence of a flux oil; and lastly the further reconcentration of the cleaned intermediate acid to acid of the final desired concentration. Thus, the contaminated 45–50 wt. percent aqueous sulfuric acid obtained from the bottom of the ethanol generator is first partially concentrated to an intermediate level of approximately 65–70 wt. percent. The intermediate acid is then subjected to the carbon removal process and the cleaned intermediate acid is then further concentrated to absorbing strength of 90–98 wt. percent as desired.

The advantages of this reconcentration process are: (1) more efficient carbon removal; (2) the 65–70 wt. percent acid is less corrosive and consequently easier handled than the hot 45–50 wt. percent acid; (3) the acid tar obtained from the 65–70 wt. percent acid oil washing process may be handled in ordinary steel equipment rather than in expensive alloy vessels; and (4) the washing of the 65–70 wt. percent acid is not directly connected to the alcohol unit and therefore does not cause a shutdown of the crude alcohol production section of the plant in the event of equipment failure on the oil washing process.

The process will be more fully understood when read in conjunction with the accompanying drawing which is a schematic view in elevation of the apparatus employed in the application of this invention to the removal of carbonaceous matter from spent sulfuric acid used in the manufacture of ethyl alcohol.

Referring now to the drawing, the process will be described in connection with the production of crude ethanol employing sulfuric acid-catalyzed hydration. Ethylene or a hydrocarbon gas stream containing 30–50% of ethylene is introduced into absorber tower 4 via line 1. Sulfuric acid of 90–98% strength is introduced via line 3 into the top of tower 4 so that the acid passes countercurrently to the rising gas. Spent gas is removed from the tower via line 5. The sulfuric acid-olefin mixture is fed through line 6 into soaker 7. Additional ethylene gas is added to the soaker via line 2 and unreacted gas returned to the main tower 4 via line 8. From the soaker the ethylene extract is fed through line 9 into hydrolyzer 10. Water is injected into the hydrolyzer through line 13 and dissolved gases are vented through line 12. The diluted and partially hydrolyzed extract is then fed through line 11 to stripping still 14 where ethanol and ethyl ether are stripped from the hydrolyzed extract and pass overhead via line 16. Additional water may be added to the still via line 17 situated at the top of the vessel. This water also serves to scrub entrained acid from the alcohol and ether vapors leaving the tower. Diluted acid of approximately 45–50 wt. percent strength, preferably 45–47 wt. percent, is withdrawn from the bottom of the stripping still via line 15, and is introduced into primary acid concentrator 18.

Steam generated by concentrating the acid in this vessel is withdrawn via line 19 and introduced into a bottom part of stripping still 14 for stripping the extract therein. In primary concentrator 18 the acid is concentrated to an intermediate strength of approximately 65-70 wt. percent, preferably 67-70 wt. percent. This partially concentrated acid of intermediate strength is passed via line 20 into cooler 21 where the acid is cooled to approximately 50-70° C., preferably about 55-60° C. Cooled acid is withdrawn via line 22. Wash oil, the nature of which will be more fully explained below, is introduced via line 23. The oil is used in amounts of 0.2 to 5 vol. percent preferably ½% to 1%, based on the volume of acid. The acid and oil are mixed by passage through pump 33 and the mixture passes via line 24 into separator 26 where the oil and carbonaceous material removed from the acid settle in an upper layer, while the purified aqueous acid remains as a lower layer. The upper oil layer is drawn off via line 28 to a tar receiver 29 wherein the mixture is allowed to stand for further separation of carbon and oil from acid. Settled acid is withdrawn from the bottom of vessel 29 by means of line 30 and is returned to the acid separator 26, or removed from the system via line 32. Tar is removed via line 31 for appropriate disposition. The settled purified acid layer in vessel 26 is drawn off via line 25, and introduced into secondary acid concentrator 34. In this vessel the purified acid is restored from 65-70 wt. percent strength to 90-98 wt. percent strength. The acid fully restored to absorption strength is withdrawn from vessel 34 via line 35 and returned to the absorption system via line 3.

The particular wash oil employed in the above process does not form a part of this invention. The oil employed is preferably a hydrocarbon oil or hydrocarbon oil mixture. The oil should be essentially paraffinic or at least essentially non-reactive toward the sulfuric acid. Any oil tending to react with the acid and form additional sludge or sluge-forming compounds should not be employed in the washing process. Suitable wash oils are kerosene, virgin gas oils, lower boiling petroleum lubricating oils, pine oil, oxo alcohol bottoms, etc. Mixtures of the above oils are also effective agents. A mixture of 10-20 parts of pine oil and 90-80 parts of kerosene is particularly effective and a preferred wash oil agent. The "oxo" bottoms mentioned above are a mixture of $C_8$-, $C_9$-, and $C_{16}$-alcohols, acetals, esters, and hydrocarbons resulting as a bottoms fraction from the fractional distillation of total crude octyl alcohol prepared by reaction of a $C_7$-olefin fraction with CO and $H_2$ in the presence of a cobalt catalyst in the so-called "oxo" process. The "oxo" bottoms have also been proven a satisfactory washing agent.

Although the invention has been described in connection with the treatment of spent ethanol generator acid it is also applicable to similar contaminated acids resulting from the preparation of other aliphatic alcohols such as isopropanol, secondary butanol, secondary pentanols, etc., and to other sulfuric acids similarly contaminated with carbonaceous material regardless of its prior history.

Having described the invention in a manner so that it can be employed by those skilled in the art,

What is claimed is:

1. A process for concentrating a dilute aqueous sulfuric acid contaminated with carbonaceous materials to a desired higher acid concentration, said acid having been stripped of hydrolyzed olefin extract, which comprises concentrating the contaminated acid to an intermediate acid strength in the range of 65-70 weight percent, adding a substantially non-reacting wash oil to the acid of said intermediate strength causing the carbonaceous material to separate from the acid by flotation with the non-reactive oil, separating the oil layer containing the carbonaceous material from the aqueous layer of purified intermediate strength acid, and further concentrating the purified intermediate acid to the desired higher concentration.

2. A process for concentrating a dilute aqueous 45-50 wt. percent sulfuric acid contaminated with carbonaceous material to 90-98 wt. percent acid, said acid having been stripped of hydrolyzed olefin extract, which comprises concentrating the contaminated 45-50 wt. percent acid to an intermediate acid strength of approximately 65-70 wt. percent, adding a substantially non-reactive wash oil to the 65-70 wt. percent acid causing the carbonaceous material to separate from the acid by flotation with the non-reactive oil, separating an oil layer containing the carbonaceous material from an aqueous layer of purified acid of 65-70 wt. percent strength, and further concentrating the purified 65-70 wt. percent acid to 90-98 wt. percent strength.

3. A process according to claim 2 in which the wash oil is a mixture containing 10-20 vol. percent of pine oil and 90-80 vol. percent of kerosene.

4. A process according to claim 2 in which the wash oil is "oxo" alcohol bottoms.

5. In a process for preparing ethyl alcohol comprising the steps of absorbing ethylene in sulfuric acid of 90-98% sulfuric acid to form an acid extract, diluting the extract with water and stripping the diluted extract to produce a crude ethyl alcohol distillate and a spent aqueous 45-50 wt. percent sulfuric acid contaminated with carbonaceous material as a bottoms product, the improvement which comprises concentrating the contaminated 45-50 wt. percent acid to an intermediate strength of approximately 65-70 wt. percent, adding a substantially non-reactive wash oil to the 65-70 wt. percent acid causing the carbonaceous material to separate from the acid by flotation with the non-reactive oil, separating an oil layer containing the carbonaceous material from an aqueous layer of purified acid of 65-70 wt. percent strength, and further concentrating the purified 65-70 wt. percent acid to 90-98 wt. percent strength.

6. A process according to claim 5 in which the wash oil is a mixture containing 10-20 vol. percent of pine oil and 90-80 vol. percent of kerosene.

7. A process according to claim 5 in which the wash oil is "oxo" alcohol bottoms.

MACK C. FUQUA.

REFERENCES CITED

The following references are of record in the file of this patent:

UNITED STATES PATENTS

| Number | Name | Date |
|---|---|---|
| 2,055,763 | Greer et al. | Sept. 29, 1936 |
| 2,426,082 | Cone | Aug. 19, 1947 |
| 2,433,030 | Cone | Dec. 23, 1947 |
| 2,512,327 | Hawes et al. | June 20, 1950 |